(12) United States Patent
Karthikeyan et al.

(10) Patent No.: US 8,456,328 B2
(45) Date of Patent: Jun. 4, 2013

(54) SYSTEM AND METHOD FOR INFORMING AN AIRCRAFT OPERATOR ABOUT A TEMPORARY FLIGHT RESTRICTION IN PERSPECTIVE VIEW

(75) Inventors: Tharangini Karthikeyan, Tamilnadu (IN); Kavitha Kumaar, Karnataka (IN); Kalpana Palaniswamy, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 369 days.

(21) Appl. No.: 12/707,331

(22) Filed: Feb. 17, 2010

(65) Prior Publication Data

US 2011/0202206 A1  Aug. 18, 2011

(51) Int. Cl.
*G06F 17/00* (2006.01)

(52) U.S. Cl.
USPC ............... 340/945; 340/963; 701/3; 701/300

(58) Field of Classification Search
USPC ................. 701/300, 3, 431, 411, 9; 340/945, 340/963
See application file for complete search history.

(56) References Cited

U.S. PATENT DOCUMENTS

| | | | |
|---|---|---|---|
| 6,289,277 B1 | 9/2001 | Feyereisen et al. | |
| 6,675,095 B1 * | 1/2004 | Bird et al. | 701/301 |
| 7,053,797 B2 | 5/2006 | Taylor | |
| 7,453,375 B2 | 11/2008 | Chamas et al. | |
| 7,598,888 B2 | 10/2009 | Matuska et al. | |
| 7,818,099 B2 * | 10/2010 | Kemp | 701/3 |
| 7,957,853 B2 * | 6/2011 | Stock et al. | 701/9 |
| 8,140,197 B2 * | 3/2012 | Lapidot et al. | 701/9 |
| 8,140,252 B2 * | 3/2012 | Wise et al. | 701/120 |
| 2005/0200501 A1 * | 9/2005 | Smith | 340/963 |
| 2005/0288831 A1 | 12/2005 | Lusardi et al. | |
| 2008/0051947 A1 | 2/2008 | Kemp | |
| 2008/0147320 A1 | 6/2008 | Burch | |
| 2008/0278351 A1 | 11/2008 | Dias et al. | |

\* cited by examiner

*Primary Examiner* — Kaitlin Joerger
(74) *Attorney, Agent, or Firm* — Ingrassia Fisher & Lorenz, P.C.

(57) ABSTRACT

A system for informing aircraft operators about a temporary flight restriction ("TFR") includes, but is not limited to, a display unit that is adapted for attachment to an aircraft. The display unit is configured to display graphical images. A processor is communicatively connected to the display unit and is configured to control the display unit. A receiver is communicatively connected to the processor and is configured to receive a broadcast containing information relating to the TFR ("TFR information") and to automatically provide the TFR information to the processor. The processor is further configured to automatically control the display unit to display a three dimensional representation of an airspace that is subject to the TFR relative to the position of the aircraft when the processor receives the TFR information from the receiver.

20 Claims, 4 Drawing Sheets

SYSTEM AND METHOD FOR INFORMING AN AIRCRAFT OPERATOR ABOUT A TEMPORARY FLIGHT RESTRICTION IN PERSPECTIVE VIEW

TECHNICAL FIELD

The present invention generally relates to a system and method for informing an aircraft operator about a temporary flight restriction and more particularly relates to a system and method for automatically providing an aircraft operator with a three dimensional depiction of airspace that is subject to a temporary flight restriction.

BACKGROUND

The Federal Aviation Administration ("FAA") and various other governmental agencies are empowered to impose temporary flight restrictions ("TFR") in airspace around and above designated geographical locations. A TFR is a restriction on flight activity for all but designated and/or authorized aircraft through an area of airspace (defined both laterally and vertically) for a specified period of time. A TFR may be imposed for a wide variety of reasons. For example, and without limitation, a TFR may be imposed for safety purposes in the vicinity of a natural disaster, for traffic management, for law enforcement, to provide a security zone around government officials, to avoid interruption to space flight operations, to avoid hazardous or inclement weather conditions, and for aerial demonstrations.

If a pilot violates temporary flight restricted airspace, such as by flying through the restricted airspace, law enforcement activity can and/or will ensue. Such enforcement activities may include intercepting the aircraft that has violated the TFR, either on the ground or in the air. Consequently, such enforcement activities can be expensive and disruptive to the operations of various governmental agencies. Accordingly, the consequences for pilots who violate temporary flight restricted airspace can be quite serious and may include the suspension or revocation of the offender's pilots license, and may even include criminal prosecution and subsequent incarceration.

Despite the potentially harsh consequence to a pilot, there have been thousands of accidental violations of temporarily restricted airspace since 2001. It is believed that these violations are caused by pilot ignorance of the restrictions on flight operations in the designated airspace. It is further believed that the pilot ignorance results from the absence of a system that adequately informs and/or warns pilots about the location of such restrictions on flight operations. Accordingly, it is desirable to provide a system that addresses the inadequacies of the existing systems and methods for apprising pilots of the existence and location of TFRs.

BRIEF SUMMARY

Various embodiments of a system and method for informing an aircraft operator about a temporary flight restriction ("TFR") are disclosed herein. In a first, non-limiting embodiment, the system includes, but is not limited to a display unit that is adapted for attachment to an aircraft. The display unit is configured to display graphical images. A processor is communicatively connected to the display unit. The processor is configured to control the display unit. A receiver is communicatively connected to the processor. The receiver is configured to receive a broadcast containing information relating to the TFR ("TFR information") and to automatically provide the TFR information to the processor. In this first non-limiting embodiment, the processor is further configured to automatically control the display unit to display a three dimensional representation of an airspace that is subject to the TFR when the processor receives the TFR information from the receiver.

In a second, non-limiting embodiment, the system includes, but is not limited to, a display unit that is adapted for attachment to an aircraft. The display unit is configured to display graphical images and textual information. A processor is communicatively connected to the display unit. The processor is configured to control the display unit. A receiver is communicatively connected to the processor. The receiver is configured to receive a broadcast containing information relating to the TFR ("TFR information") and to automatically provide the TFR information to the processor. A position determining unit is communicatively connected to the processor. The position determining unit is configured to automatically determine a geographical location of the aircraft, an altitude of the aircraft, and a heading of the aircraft. The position determining unit is further configured to automatically provide the geographical location of the aircraft, the altitude of the aircraft and the heading of the aircraft to the processor. In this second non-limiting embodiment, The processor is further configured to automatically control the display unit to display a three dimensional representation of an airspace that is subject to the TFR when the processor receives the TFR information from the receiver. The processor is still further configured to utilize the geographical location of the aircraft, the altitude of the aircraft and the heading of the aircraft to control the display unit to display the three dimensional representation in a manner that depicts a relative position of the airspace that is subject to the TFR with respect to the aircraft.

In a third non-limiting embodiment, a method for informing an aircraft operator about temporary flight restrictions ("TFR") includes, but is not limited to receiving a broadcast onboard an aircraft. The broadcast contains information about a TFR. The method further includes processing the broadcast to extract the information about the TFR and to determine the location of the aircraft with respect to the restricted airspace. The method further includes displaying on a display screen onboard the aircraft a three dimensional image depicting an airspace that is subject to the TFR.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

The non-limiting embodiments of the system and method disclosed herein for informing an aircraft operator about temporary flight restrictions ("TFR") include a display unit having a display screen mounted in the cockpit of the aircraft. In some embodiments, the display screen is capable of displaying both text and three dimensional graphics. A receiver on board the aircraft receives broadcasts from a weather service. The broadcasts include information about TFRs ("TFR information"), including the TFR type and the latitude, longitude, and altitudes of the airspace that is subject to the restriction (the "restricted airspace"). A position determining unit on board the aircraft, such as a global positioning system navigation system or an inertial navigation system is capable of determining where the aircraft is currently located with respect to the surface of the earth, ("position information") including, in some examples, the current latitude and longitude position of the aircraft, the altitude of the aircraft and the heading of the aircraft.

A processor is also located onboard the aircraft. The processor is communicatively connected to the display unit, the receiver and the position determining unit. The processor obtains the TFR information from the receiver and obtains the position information from the position determining unit. The processor is programmed or otherwise configured to determine the location of the aircraft with respect to the restricted airspace and is further configured to control the display unit to display to an aircraft operator three dimensional symbology ("3-D symbology") on the display screen that represents the restricted airspace. The processor is further configured to display the 3-D symbology in a perspective view that depicts the location of the restricted airspace with respect to the current position of the aircraft. Each of these components is configured to operate automatically, and thus the aircraft operator does not need to take any action or otherwise remember to make an inquiry about TFRs. Rather, information about the location of restricted airspace is automatically presented to the aircraft operator in a comprehensible manner. Significantly, there is no need for involvement by any external entity, such as an air traffic control facility. Rather, this onboard system can act unilaterally to keep the aircraft operator informed of restricted airspace.

A further understanding of the embodiments of the system and method disclosed herein may be obtained through a review of the illustrations accompanying this application together with a review of the detailed description that follows.

Figure 1:
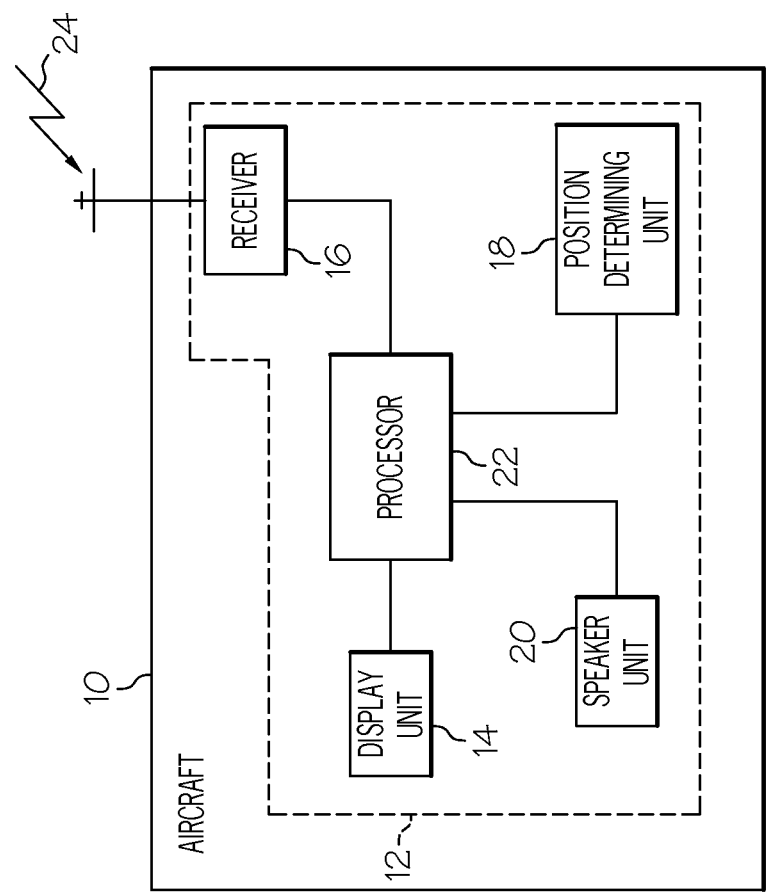
FIG. 1 is a schematic view illustrating a non-limiting embodiment of a system for informing an aircraft operator about a temporary flight restriction (TFR)

With respect to FIG. 1, an aircraft 10 is equipped with a non-limiting embodiment of a system 12 for informing an aircraft operator about a TFR. Aircraft 10 may be any type of aircraft including rotor, fixed wing aircraft, and/or lighter than air aircraft. System 12 may be employed on any aircraft engaged in flight operations, both within the United States and in any other country where broadcasts containing TFR information is available.

In the illustrated embodiment, system 12 includes a display unit 14, a receiver 16, a position determining unit 18 and a speaker unit 20, all communicatively connected to a processor 22. In other non-limiting embodiments, additional or fewer components may be included. In the embodiment illustrated in FIG. 1, the listed components are separate components, each residing at any suitable location onboard the aircraft. In this configuration, each component may serve system 12 as well as other onboard systems of aircraft 10. In other embodiments of system 10, despite their dispersed arrangement, each component may, nevertheless, be dedicated to serving only system 12. In still other non-limiting embodiments, some or all of these components may be contained within a single housing or cabinet onboard aircraft 10 and be dedicated to serving system 12 exclusively.

Display unit 14, receiver 16, position determining unit 18 and speaker unit 20 may each be communicatively connected to processor 22 in any suitable manner. For example, and without limitation, each component may be communicatively connected to processor 22 through the use of any wired connection capable of delivering a signal to and from processor 22. For example, each component may be directly communicatively connected to processor 22 via a coaxial cable or indirectly communicatively connected to processor 22 over a vehicle systems bus. In other non-limiting examples, each component may be wirelessly connected to processor 22 through the use of local area networks, Bluetooth connectivity, through the transmission of RF signals of any frequency, through infra red transmissions, or through any other suitable wireless connection.

Display unit 14 may be any sort or type of display system that is configured to depict both three dimensional graphic images and text. For example, display unit 14 may be a Cathode Ray Tube (CRT) display device, a flat panel display device, a Liquid Crystal Display (LCD) device, a plasma display device, an electro-luminescent display device, a Light Emitting Diode (LED) display device, a holographic display device such as a Head Up Display (HUD), a Micro Mirror Device (MMD) display device, or the like. Additionally, the schematically represented display unit 14 may include multiple individual display screens communicatively connected or otherwise configured to cooperate with one another. An example of a suitable display unit 14 would include any type of synthetic vision system display such as an integrated primary flight display. Synthetic vision system displays are known in the art and are frequently configured to provide aircraft operators with three dimensional depictions of terrain around the aircraft and to impose text and symbology over such three dimensional depictions. Other suitable displays may include near to eye displays worn by pilots and configured to present images on a screen, lens or projector disposed proximate to the pilot's eye. Display unit 14 may be controlled by any suitable processor, including processor 22, to display images.

Receiver 16 may be any type of wireless communications receiver. In one non-limiting example, receiver 16 may be a satellite communications receiver. In other embodiments, receiver 16 may be configured to receive microwave transmission or any other type of RF transmissions. Receiver 16 may include an antenna to detect and receive the wireless communication signals and may include associated electronics to process the received signals. In some embodiments, receiver 16 may be configured to automatically provide any and all signals to processor 22 upon reception. In other embodiments, receiver 16 may be configured to store received signals until such time as processor 22 retrieves them.

In the embodiment illustrated in FIG. 1, receiver 16 receives signal 24 from one or more satellites that are configured to broadcast information from a local or national weather service. In other non-limiting embodiments, signal 24 may be transmitted by any surface based or airborne transmitter. Signal 24 may be transmitted constantly or may periodically repeat. Signal 24 includes TFR information including the location (e.g., in latitude and longitude coordinates) of the boundaries of one or more restricted air airspaces. The TFR information also includes the maximum altitude and minimum altitude of the restricted airspace, the type of restriction associated with the restricted airspace and, if applicable, the time period for which such airspace is restricted.

Position determining unit 18 is configured to detect the position of aircraft 10 with respect to the earth (e.g. the latitude and longitude coordinates) as well as the altitude and the heading of aircraft 10. In some non-limiting embodiments, position determining unit 18 may be a single integrated unit such as, but not limited to, a GPS navigation system or an inertial navigation system. In other non-limiting embodiments, position determining unit 18 may comprise a plurality of discrete systems, each providing one or more items of the location information and which may be aggregated together to arrive at the location, the altitude, and the heading of aircraft 10. In some non-limiting embodiments, position determining unit 18 may be configured to automatically provide the position information to processor 22 while in other non-limiting embodiments, processor 22 may be configured to automatically or periodically retrieve such position information from position determining unit 18.

Speaker unit 20 is configured to audibly communicate information to the operators of aircraft 10. In some embodiments, speaker unit 20 may be one or more speakers integrated into display unit 14. In other embodiments, speaker unit 20 may comprise separate components mounted elsewhere on the aircraft. In still other embodiments, speaker unit 20 may comprise an earpiece worn in close proximity to an ear of an aircraft operator. Alternatively, speaker unit 20 may comprise any other device capable of emitting audible signals. Speaker unit 20 may comprise any one or more of these components as desired. Speaker unit 20 may be configured to transmit sounds and/or speech and is configured to receive control signals from processor 22. In some non-limiting embodiments, speaker unit 20 may be dedicated to serving system 12 while in other non-limiting embodiments, speaker unit 20 may be utilized by other onboard systems.

Processor 22 may be any type of onboard computer, computer system, or microprocessor that is configured to perform algorithms, to execute software applications, to execute subroutines and/or to be loaded with and to execute any other type of computer program. Processor 22 may comprise a single processor or a plurality of processors acting in concert. Processor 22 may be dedicated to system 12 or may be used in connection with the operation of other onboard systems. Processor 22 is configured (i.e., programmed) to obtain TFR information from receiver 16, and to receive position information from position determining unit 18.

Utilizing the TFR information, processor 22 is configured to extract the location of the restricted airspace, the minimum and maximum altitudes of the restricted airspace, the boundaries of the restricted air space, and the nature/type of the restriction imposed on the airspace. Processor 22 is configured to utilize the position information to determine the location of the restricted airspace with respect to aircraft 10, the range from aircraft 10 to the restricted airspace, and whether aircraft 10 is heading towards the restricted airspace. Processor 22 is further configured to utilize the TFR information and the position information to control display unit 14 and to control speaker unit 20 to alert an operator of aircraft 10 to the location of nearby restricted airspace. For example, processor 22 is configured to control display unit 14 to display a 3-D symbology representative of the restricted airspace and, in some embodiments, to display the 3-D symbology in a position on display unit 14 that is representative of the actual spatial relationship between aircraft 10 and the restricted airspace. In some embodiments, processor 22 may also be configured to determine the current display range setting for display unit 14. For example, display unit 14 may have an operator selectable display range setting such that display 14 only displays items/terrain that are positioned within the selected range from the aircraft. Processor 22 may be further configured to determine whether the restricted airspace is within the display range setting of display unit 14 and to refrain from displaying three dimensional symbologies that are representative of restricted airspaces that are located outside of the selected display range setting. Rather, when an airspace is located outside of the display range setting, but on the aircraft's flight path, processor 22 may be configured to display a text message indicating the presence of an out of range restricted airspace. Processor 22 may also be configured to control display unit 14 to display text over or proximate to the 3-D symbology that relates to the restricted airspace represented by the 3-D symbology.

Figure 2:
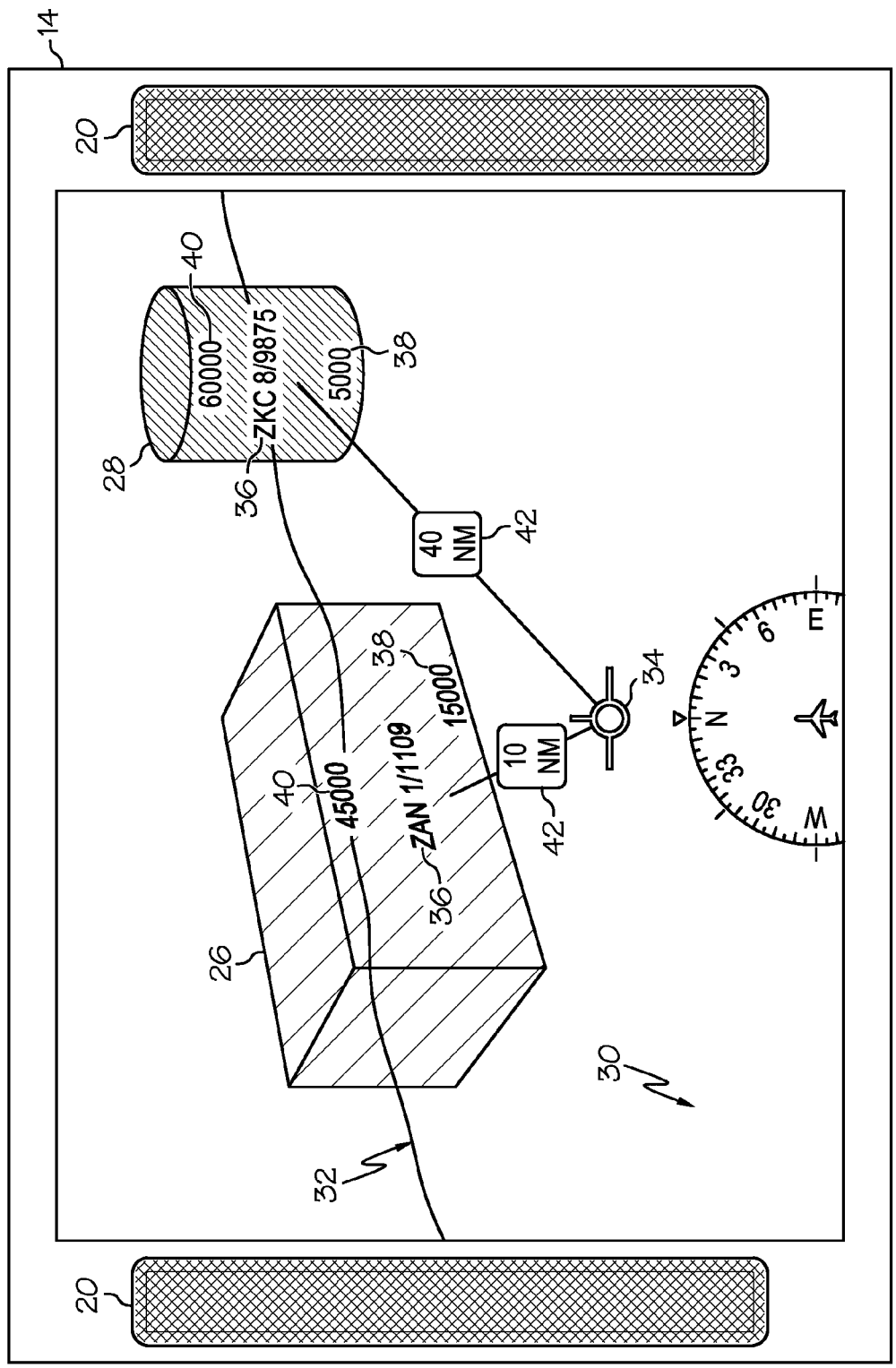
FIG. 2-3 are illustrations of non-limiting examples of displays provided to aircraft operators by the system of FIG. 1.
Figure 3:
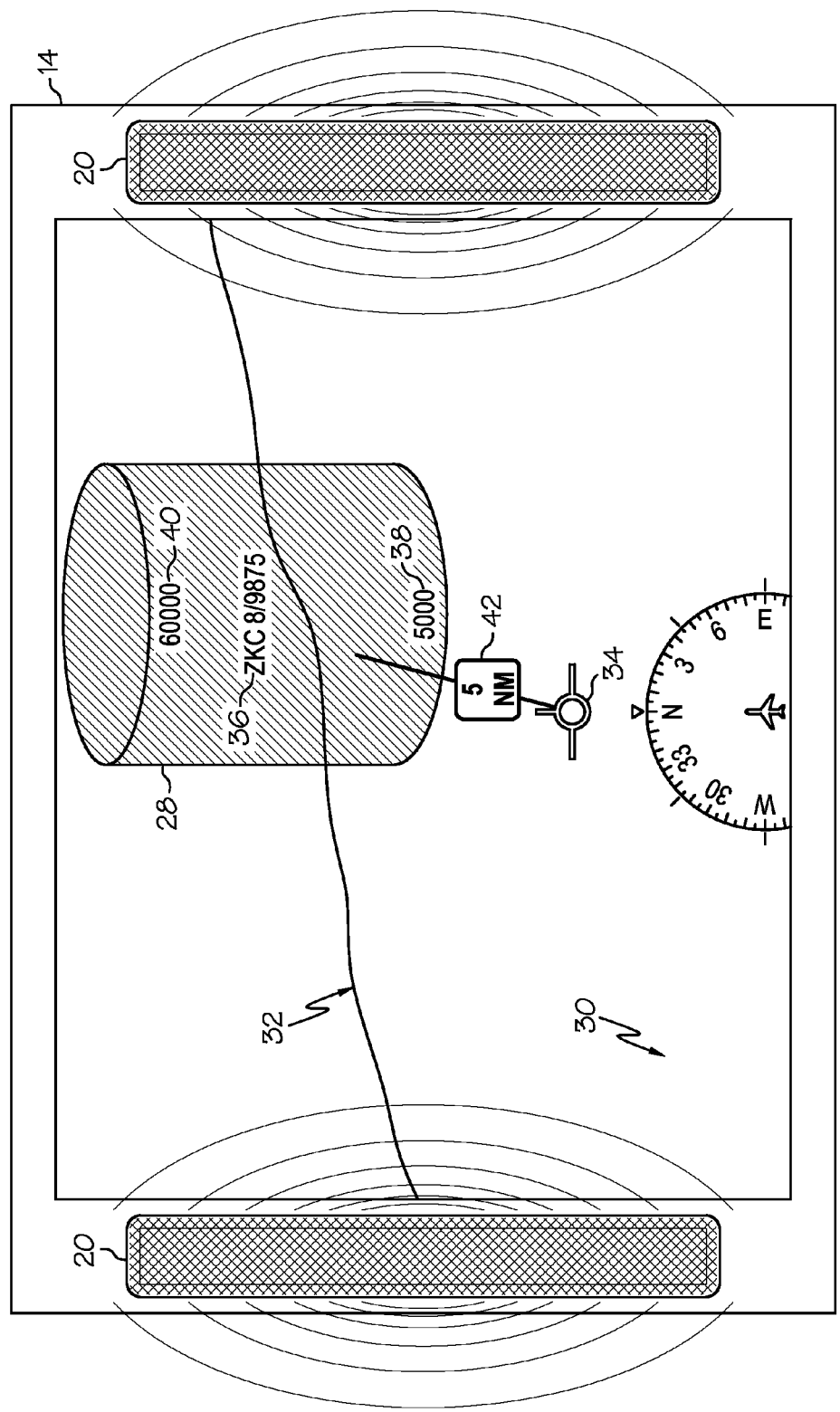

With respect to FIGS. 2 and 3, example displays generated by system 12 are presented. With respect to FIG. 2, a first 3-D symbology 26 representing a first restricted airspace and a second 3-D symbology 28 representing a second restricted airspace are illustrated. Various components of the environment, including terrain 30 and horizon 32 are illustrated in a manner corresponding to the appearance of these components from the window of the cockpit in aircraft 10. An aircraft icon 34 representative of aircraft 10 is also symbolically represented. Using these elements, the spatial relationship between aircraft 10 and the first and the second restricted airspaces can be presented to the aircraft operator in a simple, easily comprehensible manner. As illustrated, first 3-D symbology 26 is generally rectangular in shape. This indicates that the first restricted airspace has rectangular boundaries. Second 3-D symbology 28 is cylindrical in shape and indicates that the shape of the second restricted airspace is cylindrical. It should be understood that a rectangular and a cylindrical shape were selected only for ease of illustration and that restricted airspace having any geometric configuration may be displayed using system 12.

Various textual items may be displayed in connection with first 3-D symbology 26. For example, a notam identifier 36 including the characters "ZAN 1/1109" is displayed across the center of 3-D symbology 26. A notam refers to a "notice to airmen" and comprises a message that is expected to be of interest to pilots flying to or through the area addressed in the notam. Notam identifier 36 reflects the reason for restricting an airspace (i.e., hazardous conditions, aerial demonstration, etc. . . . ). In some embodiments, first 3-D symbology and second 3-D symbology may also be displayed in a color that corresponds to the type and/or severity of restriction restricting the airspace represented by the symbology. This is illustrated in FIG. 2 through the use of shading, i.e., first 3-D symbology 26 is shaded differently than second 3-D symbology 28 to simulate the use of different colors. In some embodiments, the color coding of the 3-D symbology is as follows:

TFR in the vicinity of disaster/hazard areas may be displayed in the color amber. Only aircraft having authorization may fly through a restricted airspace colored in amber.

TFR in national disaster areas in the state of Hawaii may be displayed in the color cyan. When a restricted airspace is colored in cyan, this signifies that the airspace restriction will persist for more than 90 days.

Emergency air traffic rules may be displayed in the color amber.

Flight restrictions in the proximity of the presidential and other parties may be displayed in the color red. There are no circumstances in which an aircraft will be authorized to fly through a restricted airspace colored in red.

Flight limitations in the proximity of space flight operations may be displayed in the color red.

Management of aircraft operations in the vicinity of an aerial demonstration and major sporting events may be displayed in the color lavender. Only aircraft having no objection certificates can fly through a restricted airspace colored in lavender.

Special security instructions may be displayed in the color magenta. Aircraft are permitted to fly through restricted airspace that is colored in magenta after receiving and following special security instructions.

Additionally, a minimum altitude designator 38 and a maximum altitude designator 40 may be positioned adjacent the bottom and the top, respectively, of 3-D symbology 26. In the illustrated embodiment, minimum altitude designator 38 represents the lowest altitude of the restricted airspace while maximum altitude designator 40 represents the highest altitude of the restricted airspace. In the example illustrated in FIG. 2, the first restricted airspace extends from 15,000 feet to 45,000 feet and the second restricted airspace extends from 5,000 feet to 60,000 feet.

A range 42 may also be displayed by display unit 14. Range 42 reflects the distance from aircraft 10 to the first and the second restricted airspaces. A line extending from aircraft icon 34 to first 3-D symbology 26 and from aircraft icon 34 to second 3-D symbology may also be depicted to help illustrate and correlate the range presented by range 42. As illustrated in FIG. 2, aircraft 10 is ten nautical miles from the first restricted airspace and forty nautical miles from the second restricted airspace. First 3-D symbology 26 and second 3-D symbology 28 are each depicted in perspective to reflect their respective distances from aircraft 10. Accordingly, although the second restricted airspace is a much larger volume of airspace than the first restricted airspace, first 3-D symbology 26 appears much larger than second 3-D symbology 28 because of its closer proximity to aircraft 10.

With respect to FIG. 3, display unit 14 now depicts an image wherein aircraft 10 has flown thirty five nautical miles closer to the second restricted airspace. Accordingly, in FIG. 3, aircraft 10 is now just five nautical miles from the second restricted airspace. The symbology relating to the first restricted airspace is no longer visible and second 3-D symbology 28 is much larger than it had been illustrated in FIG. 2 to reflect its close proximity. In some embodiments, second 3-D symbology 28 would become continuously larger as aircraft 10 draws nearer to the second restricted airspace.

In some embodiments, processor 22 may be configured to control display unit 14 and speaker unit 20 to alert an operator of aircraft 10 when aircraft 10 flies closer than a predetermined distance from a restricted airspace. The predetermined distance may be any suitable distance and may vary with the type of aircraft equipped with system 10 or the speed at which aircraft 10 is traveling. In other embodiments, the predetermined distance may be operator selected. In the embodiment illustrated in FIG. 3, aircraft 10 is closer to the second restricted airspace than the predetermined distance. In the illustrated embodiment, processor 22 is configured to control display unit 14 and speaker unit 20 to warn the aircraft operator about the close proximity of aircraft 10 to the second restricted airspace. In the illustrated embodiment, processor 22 is configured to control display unit 14 to change the color in which range 42 is displayed. For example, when aircraft 10 is greater than the predetermined distance from a restricted airspace, range 42 may be depicted in black. As aircraft 10 nears the predetermined distance (e.g., when aircraft 10 approaches to within 10 miles of the predetermined distance), then range 42 may be depicted in amber to alert the aircraft operator to the aircraft's proximity to a restricted airspace. When aircraft 10 closes to within less than the predetermined distance from the restricted airspace, range 42 may change to red to signal the pilot that the aircraft is in danger of entering restricted airspace. FIG. 3 illustrates, among other things, how range 42 may be displayed when an aircraft 10 reaches a position that is within the predetermined distances of the second restricted airspace. In FIG. 3, range 42 is illustrated in a boldface type font to convey the change of the display from amber to red. In other embodiments, range 42 may flash or the font size used to display range 42 may increase. In still other embodiments, a combination of these changes to range 42 or any other change effective to get the operator's attention may be implemented to warn the aircraft operator of the proximity of aircraft 10 to the restricted airspace. In addition, processor 22 may further be configured to control speaker unit 20 to issue an audible alert, such as a siren, an alarm, or spoken words warning the aircraft operator of the proximity of aircraft 10 to the restricted airspace.

Figure 4:
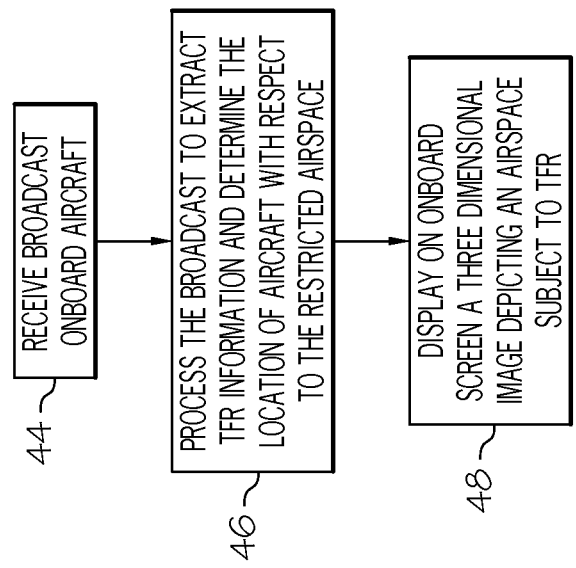
FIG. 4 is a block diagram depicting a method for informing an aircraft operator about TFRs.

With respect to FIG. 4, a method for informing an aircraft operator about TFRs is depicted. At box 44, a broadcast is received onboard aircraft 10 using system 12. The broadcast contains information about TFRs in the vicinity of aircraft 10. At box 46, the broadcast is processed. At this step, information about the TFR is extracted from the broadcast and is used to determine the location of the aircraft with respect to the restricted airspace. At box 48, the aircraft uses system 12 in the manner described above or any other system or apparatus to display a three dimensional representation of the one or more TFRs included in the broadcast on a display screen onboard the aircraft and to display such three dimensional representations in a manner that conveys the relative position of the restricted airspaces with respect to aircraft 10.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for informing an aircraft operator about a temporary flight restriction ("TFR"), the system comprising:
   a display unit adapted for attachment to an aircraft, the display unit configured to display graphical images;
   a processor communicatively connected to the display unit, the processor configured to control the display unit; and
   a receiver communicatively connected to the processor, the receiver configured to receive a broadcast containing information relating to the TFR ("TFR information") and to automatically provide the TFR information to the processor,
   wherein the processor is further configured to automatically control the display unit to display a three dimensional representation in a position on the display unit that represents an actual spatial relationship in a perspective view between the aircraft and an airspace that is subject to the TFR when the processor receives the TFR information from the receiver.

2. The system of claim 1, wherein the processor is configured to control the display unit in a manner such that the three dimensional representation has a shape that corresponds to a shape of the airspace that is subject to the TFR.

3. The system of claim 1, wherein the display unit is further configured to display textual information and wherein the processor is further configured to control the display unit to display a NOTAM identifier corresponding to a type of TFR associated with the airspace that is subject to the TFR.

4. The system of claim 1, wherein the display unit is further configured to display textual information and wherein the processor is further configured to control the display unit to display a maximum altitude and a minimum altitude of the airspace that is subject to the TFR.

5. The system of claim 1, wherein the display unit is further configured to display textual information and wherein the processor is further configured to control the display unit to display a range from the aircraft to the airspace that is subject to the TFR.

6. The system of claim 5, wherein the range is displayed in a first color when the aircraft is greater than a predetermined distance from the airspace that is subject to the TFR and wherein the range is displayed in a second color when the aircraft is less than the predetermined distance from the airspace that is subject to the TFR.

7. The system of claim 1, wherein the processor is configured to control the display unit to color code the three dimensional representation in a manner that corresponds to a type of TFR that is associated with the airspace that is subject to the TFR.

8. The system of claim 1, wherein a size of the three dimensional representation corresponds with a range from the aircraft to the airspace that is subject to the TFR.

9. The system of claim 8, wherein the size varies as the range varies.

10. The system of claim 1, further comprising a speaker unit communicatively connected to the processor and wherein the processor is further configured to control the speaker unit to provide aural alerts when the aircraft approaches to within a predetermined distance from the airspace that is subject to the TFR.

11. A system for informing an aircraft operator about temporary flight restrictions ("TFR"), the system comprising:
   a display unit adapted for attachment to an aircraft, the display unit configured to display graphical images and textual information;
   a processor communicatively connected to the display unit, the processor configured to control the display unit;
   a receiver communicatively connected to the processor, the receiver configured to receive a broadcast containing information relating to the TFR ("TFR information") and to automatically provide the TFR information to the processor; and
   a position determining unit communicatively connected to the processor, the position determining unit configured to automatically determine a geographical location of the aircraft, an altitude of the aircraft and a heading of the aircraft, the position determining unit being further configured to automatically provide the geographical location of the aircraft, the altitude of the aircraft and the heading of the aircraft to the processor;
   wherein the processor is further configured to automatically control the display unit to display a three dimensional representation in a position on the display unit that represents an actual spatial relationship in a perspective view between the aircraft and an airspace that is subject to the TFR when the processor receives the TFR information from the receiver, and wherein the processor is still further configured to utilize the geographical location of the aircraft, the altitude of the aircraft and the heading of the aircraft to control the display unit to display the three dimensional representation in a manner that depicts a relative position of the airspace that is subject to the TFR with respect to the aircraft.

12. The system of claim 11, wherein the position determining unit comprises one of a global positioning satellite system and an inertial navigation system.

13. The system of claim 11, wherein the processor is configured to control the display unit in a manner such that the three dimensional representation has a shape that corresponds to a shape of the airspace that is subject to the TFR.

14. The system of claim 11, wherein the processor is further configured to control the display unit to display a NOTAM identifier corresponding to the TFR associated with the airspace that is subject to the TFR.

15. The system of claim 11, wherein the processor is further configured to control the display unit to display a maximum altitude and a minimum altitude of the airspace that is subject to the TFR.

16. The system of claim 11, wherein the processor is further configured to control the display unit to display a range from the aircraft to the airspace that is subject to the TFR.

17. The system of claim 16, wherein the range is displayed in a first color when the aircraft is greater than a predetermined distance from the airspace that is subject to the TFR and wherein the range is displayed in a second color when the aircraft is less than the predetermined distance from the airspace that is subject to the TFR.

18. The system of claim 11, wherein the three dimensional representation is color coded in a manner that corresponds with a type of TFR.

19. The system of claim 11, further comprising a speaker unit communicatively connected to the processor and wherein the processor is further configured to control the speaker unit to provide aural alerts when the aircraft approaches to within a predetermined distance from the airspace that is subject to the TFR.

20. A method for informing an aircraft operator about a temporary flight restriction ("TFR"), the method comprising the steps of:
   receiving a broadcast onboard an aircraft, the broadcast containing information about the TFR;
   processing the broadcast to extract the information about the TFR and to determine the location of the aircraft with respect to the restricted airspace; and
   displaying on a display screen onboard the aircraft a three dimensional image in a position on the display unit that represents an actual spatial relationship in a perspective view between the aircraft and an airspace that is subject to the TFR, wherein the three dimensional image depicts the airspace that is subject to the TFR.

* * * * *